United States Patent
Nevdahs et al.

(10) Patent No.: US 11,259,195 B1
(45) Date of Patent: Feb. 22, 2022

(54) SECURITY CAMERA DRONE COMMUNICATION COUPLING TO CONTROL AND COMPUTING STATION

(71) Applicant: Alarm.com Incorporated, Tysons, VA (US)

(72) Inventors: Ilja Nevdahs, Carnikava (LV); Agris Kipurs, Jelgava (LV); Konstantin Othmer, Los Altos Hills, CA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/820,570

(22) Filed: Mar. 16, 2020

Related U.S. Application Data (60) Provisional application No. 62/819,133, filed on Mar. 15, 2019.

(51) Int. Cl.
| | |
|---|---|
| *H04W 28/04* | (2009.01) |
| *B64C 39/02* | (2006.01) |
| *H04W 24/04* | (2009.01) |
| *H04N 7/18* | (2006.01) |
| *H04W 4/40* | (2018.01) |
| *B64F 1/00* | (2006.01) |
| *H04W 88/04* | (2009.01) |

(52) U.S. Cl.
CPC .......... *H04W 24/04* (2013.01); *B64C 39/024* (2013.01); *B64F 1/007* (2013.01); *H04N 7/181* (2013.01); *H04W 4/40* (2018.02); *B64C 2201/127* (2013.01); *B64C 2201/146* (2013.01); *H04W 88/04* (2013.01)

(58) Field of Classification Search
CPC ....... H04W 24/04; H04W 4/40; H04W 88/04; H04W 28/04; H04W 72/0406; B64F 1/007; B64C 39/024; B64C 2201/146; B64C 2201/127; H04N 7/181
See application file for complete search history.

(56) References Cited

U.S. PATENT DOCUMENTS

| | | | |
|---|---|---|---|
| 9,678,507 B1 | 6/2017 | Douglas et al. | |
| 9,709,983 B2 | 7/2017 | Seydoux et al. | |
| 9,866,313 B1* | 1/2018 | Murphy | ................ H04W 16/26 |
| 9,986,440 B2 | 5/2018 | Guvenc | |
| 2014/0270743 A1* | 9/2014 | Webb | ................ H04N 5/23248 396/55 |
| 2016/0140851 A1 | 5/2016 | Levy et al. | |

(Continued)

*Primary Examiner* — Andrew Wendell
(74) *Attorney, Agent, or Firm* — Fish & Richardson P.C.

(57) ABSTRACT

Methods, systems, and apparatus, including computer programs encoded on computer-storage media, for security camera drone communication coupling to control and computing station. In some implementations, a first drone and a second drone are configured to monitor a property. A base station is configured to communicate with the first drone and the second drone. The first drone is configured to determine the first drone is unable to communicate with the base station and able to communicate with the second drone. Based on determining the first drone is unable to communicate with the base station and able to communicate with the second drone, the first drone is configured to determine the first drone is able to communicate with the second drone, transmit, to the second drone, a data packet and instructions to transmit the data packet to the base station.

20 Claims, 4 Drawing Sheets

(56) References Cited

U.S. PATENT DOCUMENTS

| | | | |
|---|---|---|---|
| 2016/0253907 A1* | 9/2016 | Taveira | G07B 15/00 |
| | | | 701/3 |
| 2016/0378109 A1* | 12/2016 | Raffa | H04N 7/185 |
| | | | 701/2 |
| 2017/0053169 A1* | 2/2017 | Cuban | B64C 39/024 |
| 2017/0171761 A1* | 6/2017 | Guvenc | H04W 36/20 |
| 2018/0237148 A1* | 8/2018 | Hehn | B64C 39/024 |
| 2018/0319495 A1* | 11/2018 | Tu | H04W 4/029 |
| 2019/0061941 A1* | 2/2019 | Zhang | B64C 17/02 |
| 2019/0313317 A1* | 10/2019 | Murphy | H04W 36/00837 |
| 2019/0339718 A1* | 11/2019 | Koch | G08G 5/0043 |
| 2020/0130830 A1* | 4/2020 | Dong | G05D 1/0016 |
| 2020/0169922 A1* | 5/2020 | Ozturk | H04W 76/27 |
| 2021/0049883 A1* | 2/2021 | Nassi | G08B 13/1965 |

* cited by examiner

SECURITY CAMERA DRONE COMMUNICATION COUPLING TO CONTROL AND COMPUTING STATION

CROSS-REFERENCE TO RELATED APPLICATION

This application claims the benefit of U.S. Application No. 62/819,133, filed Mar. 15, 2019, which is incorporated by reference.

BACKGROUND

Many properties are equipped with monitoring systems that include sensors and connected system components.

SUMMARY

Techniques are described for a security camera drone communication coupling to control and computing station. Security camera drones may be deployed on a premise to be surveilled with a security system. Security camera drones may include hardware and software components to perform data-intensive and compute-intensive tasks, such as odometry, mapping, navigation, computer vision and other tasks. Embodiments described below may derive performance and cost benefits by decoupling drone components used for computationally-intensive and data-intensive tasks (e.g. high-performance components) from components that perform non-intensive computation (e.g. simple-computer components). High-performance components may be moved to a remote, stationary control and computer station leaving simple-computer components onboard the drone. Low-latency high-speed data links may be introduced to allow simple-computer components onboard the drone to communicate with high-performance computer components on the stationary control and computer station or base station.

According to an innovative aspect of the subject matter described in this specification, a monitoring system includes a first drone that is configured to monitor a property; a second drone that is configured to monitor the property; and a base station that is configured to communicate with the first drone and the second drone. The first drone is configured to determine that the first drone is unable to communicate with the base station and determine that the first drone is able to communicate with the second drone. The first drone is also configured to, based on determining that the first drone is unable to communicate with the base station and based on determining that the first drone is able to communicate with the second drone, transmit, to the second drone, a data packet and instructions to transmit the data packet to the base station.

These and other implementations can each optionally include one or more of the following features. For example, the second drone may be configured to receive, from the first drone, the data packet and instructions to transmit the data packet to the base station. Based on receiving, from the first drone, the data packet and instructions to transmit the data packet to the base station, the second drone may transmit, to the base station, the data packet.

In some implementations, the base station is configured to determine that the base station is unable to communicate with the ground first drone and determine that the base station is able to communicate with the second drone. Based on determining that the base station is unable to communicate with the first drone and based on determining that the base station is able to communicate with the second drone, the base station may transmit, to the second drone, an additional data packet and instructions to transmit the data packet to the first drone.

In some implementations, the second drone is configured to receive, from the base station, the data packet and instructions to transmit the additional data packet to the first drone. Based on receiving, from the base station, the additional data packet and instructions to transmit the data packet to the first drone, the second drone may transmit, to the first drone, the additional data packet.

In some implementations, the first drone and the second drone each comprise an attitude stabilizer, a motor controller, a position controller, an optical flow unit, a sensor, and a radio.

In some implementations, the base station includes an obstacle avoider, a navigator, a neural network, an object recognizer, an object classifier, an event recognizer, an event classifier, a machine vision unit, a visual-inertial odometry unit, a point cloud processing unit, a trajectory generation unit, and a radio.

In some implementations, the obstacle avoider, the navigator, the neural network, the object recognizer, the object classifier, the event recognizer, the event classifier, the machine vision unit, the visual-inertial odometry unit, the point cloud processing unit, the trajectory generation unit are configured to simultaneously process data associated with the first drone and data associated with the second drone.

In some implementations, the base station includes a drone dock or a monitor control unit. The drone dock may be configured to receive the first drone and the second drone.

In some implementations, the first drone is configured to determine that an event is occurring at the property and, based on the event that is occurring at the property, determine that the first drone is unable to communicate with the base station and determining that the first drone is able to communicate with the second drone.

In some implementations, the first drone is configured to determine a status of the monitoring system and, based on the status of the monitoring system, determine that the first drone is unable to communicate with the base station and determine that the first drone is able to communicate with the second drone.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. For example, implementations may help to make drones more affordable, lighter, and more energy efficient as high-performance resources are centralized and individual drones may be produced with only simple-computer components employed to keep the drone in the air, control its attitude, position, velocity, etc. Upgrading systems can also be streamlined as an upgrade to one given base station that functions as a high-performance resource for a number of drones, may result in improvements for each of the number of drones. By combining multiple base stations instances into a data-center or performing calculations using cloud-based data services, an operation involving a number of drones may be scaled to ever-increasing size more easily.

For another example, implementations may help in communications between a drone and a base station, particularly a drone that is unable to communicate with a base station and another drone that is able to communication with the base station. This can be useful in a number of scenarios an example of which would be particular terrain blocking signals between a first drone and a base station. The first drone can communicate with a second drone that is able to communication with the base station. The first drone can transmit data and instructions to relay the data to the base station. In this way, range for a given base station can also be improved.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
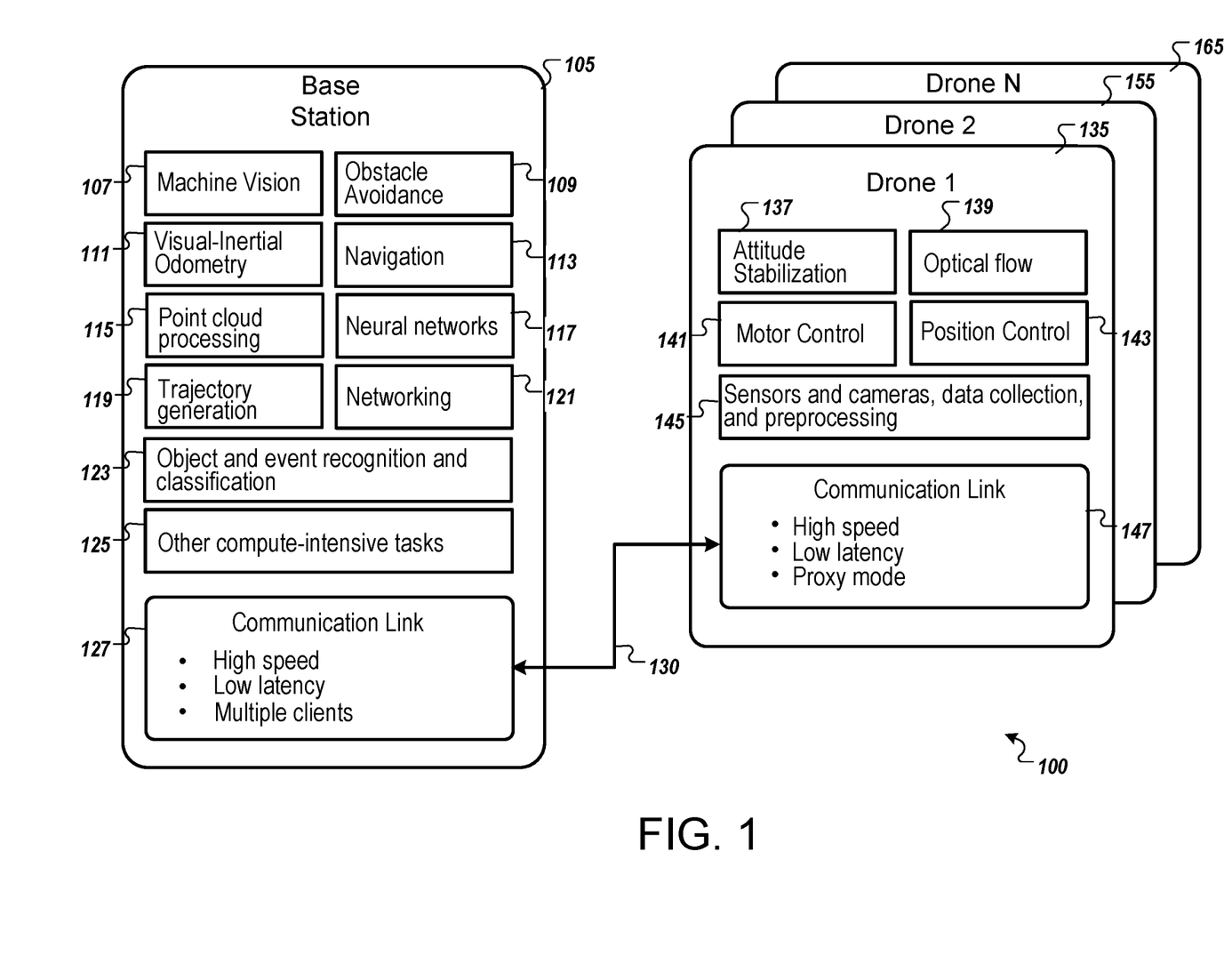
FIG. 1 is a diagram showing an example of hardware and software decoupling for a plurality of drones and a base station.

FIG. 1 is a diagram showing an example system 100 for hardware and software decoupling using a plurality of drones and a base station. The system 100 includes a base station 105, a plurality of drones including a first drone 135 and a second drone 155. An Nth drone 165 is shown to illustrate the existence of more than two drones in the system 100. A communication channel 130 is shown that connects the base station 105 to the first drone 135.

The base station 105 includes high-performance components configured to perform one or more tasks. The components include machine vision 107, obstacle avoidance 109, visual-inertial odometry 111, navigation 113, point cloud processing 115, neural networks 117, trajectory generation 119, networking 121, object and event recognition and classification 123, other compute-intensive tasks 125, and a base station communication link 127.

In some implementations, the base station 105 includes more or less high-performance components. Components listed here may not be included. For example, the neural networks 117 may not be a component within a given base station. Similarly, components not listed here may be included. For example, a power source finder may be included on the base station 105.

The first drone 135 is shown as an example of a drone within the system 100. Aspects discussed in reference to the first drone 135 may be applied to the second drone 155 as well as the Nth drone 165 that represents one or more other drones in the system 100.

The first drone 135 includes simple-computer components configured to perform one or tasks. The components include attitude stabilization 137, optical flow 139, motor control 141, position control 143, sensors and cameras, data collection, and preprocessing 145, and a first drone communication link 147.

In some implementations, the first drone 135 hosts other modules. For example, the first drone 135 may host other modules used for drone flight, attitude and position estimation and control, as well as onboard sensors (e.g., optical and infrared (IR) cameras, light detection and ranging (LIDAR), radar, etc.)

In some implementations, a base station or a drone hosts modules to perform computationally-intensive tasks. For example, the base station 105 can host a dedicated machine vision module that performs the operations of the machine vision 107 component. In some implementations, the modules hosted by a base station or a drone may be external. For example, the modules hosted by the base station 105 may be connected to the base station 105 by a wireless network or wired cable or network.

The base station 105 hosts hardware and software modules for sensor data streaming from the first drone 135 as well as command and control data sending from the base station 105 to the first drone 135. The base station communication link 127 can enable streaming from the first drone 135 and control data sending from the base station 105 to the first drone 135.

The first drone 135 hosts hardware and software modules for sensor data collection, aggregation or preprocessing, as well as prepackaging for data streaming to the base station 105. The first drone communication link 147 includes data streaming to and from the base station 105. The first drone communication link 147 also includes a proxy mode. The proxy mode is discussed in more detail in reference to FIG. 2 below.

The base station communication link 127 and the first drone communication link 147 enable high speed connectivity between the base station 105 and the first drone 135 as well as low latency of communications such as the communication channel 130. The base station communication link 127 also includes compatibility for multiple clients. As mentioned, aspects and features discussed in reference to the first drone 135 may be applied to the second drone 155 and the Nth drone 165. The second drone 155 and the Nth drone 165 may communicate with the base station 105 using their respective communication links as well as the base station communication link 127. The base station communication link 127 allows for multiple client (e.g., the first drone 135, the second drone 155, the Nth drone 165, etc.) interactions.

While in operation, the first drone 135, as well as the second drone 155 and the Nth drone 165, perform non-intensive computation with simple-computer components. For example, the first drone 135 can handle components such as the attitude stabilization 137 to ensure that the first drone 135 is oriented with landing gear perpendicular to a landing surface before attempting a landing.

The first drone 135 can also handle the optical flow 139. The optical flow 139 can include tracking the pattern of motion, or apparent motion, of objects, surfaces, or edges from captured visual data caused by the relative motion between the first drone 135 and a given scene. The first drone 135 can handle the motor control 141 where motors can be propellers providing lift, steering mechanisms, landing gear or others depending on implementation. The first drone 135 can perform the position control 143 using one or more of the features of the first drone 135 to adjust a position of the first drone 135.

The first drone 135 can also use sensors and cameras. The sensors and cameras, data collection, and preprocessing 145 can provide one or more of the other modules hosted by the first drone 135 with data. For example, the optical flow 139 can use visual data from a camera within the sensors and cameras, data collection, and preprocessing 145 to track the pattern of motion, or apparent motion, of objects, surfaces, or edges from captured visual data caused by the relative motion between the first drone 135 and a given scene.

In some implementations, one or more modules can work together to perform tasks jointly. For example, the sensors and cameras, data collection, and preprocessing 145 can provide data to the optical flow 139 or the attitude stabilization 137. In some implementations, modules may use other features or instrument readings not shown in FIG. 1. For example, the attitude stabilization 137, or other module, can use measurements from a gyroscope or accelerometer to aid in processes or calculations.

For more computationally-intensive and data-intensive tasks, high-performance components on the base station 105 can be used. By concentrating the computationally intensive components in elements not onboard drones or other devices, lighter, cheaper, and more power efficient drones or other devices can be constructed and deployed. For example, the first drone 135 can provide data to the base station 105 with the first drone communication link 147. The data can be sent in the communication channel 130. The base station 105 can receive the data with the base station communication link 127.

The data received by the base station 105 from the first drone 135 can be processed by any of the modules hosted by the base station 105. For example, the base station 105 receives data from the optical flow 139 and the sensors and cameras, data collection, and preprocessing 145. The base station 105 processes the received data using the navigation 113 module. The navigation 113 processes navigation for the first drone 135 based on the received data and relevant to a current mission or situation. The navigation provided by the navigation 113 module can then be sent over the communication channel 130 to the first drone communication link 147.

Depending on implementation, the first drone 135 can take the navigation provided by the navigation 113 module and use it internally with components such as the attitude stabilization 137, the motor control 141, the position control 143, or the sensors and cameras, data collection, and preprocessing 145 or send the navigation provided by the navigation 113 module to another client or drone within the system 100. In some cases, this can be considered a proxy mode. Proxy mode, and a specific example will be discussed with more detail in reference to FIG. 2.

In some implementations, multiple communications between a drone and a base station may be required to perform a particular operation. For example, the base station 105, after receiving data from the first drone 135, may request additional data from the first drone 135. The additional data may, depending on implementation, include a longer period of camera or visual data, more or different types of information from the one or more other modules hosted by the first drone 135, or re-sending of the initial data. In general, the base station 105 may communicate with the first drone 135 in order to obtain one or more pieces of information relevant to modules hosted by either the base station 105 or the first drone 135.

In some implementations, more than one instance of a communication can be used in an exchange between a drone and a base station. For example, the first drone 135 can send data to the base station 105 using the communication channel 130. After processing the data, the base station 105 can then send data in response using another communication channel.

In some implementations, a base station performs one or more other processes on the data received from a client or drone in a system. For example, instead of providing navigation using the navigation 113 module, the base station may use the object and event recognition and classification 123 module. In some cases, the object and event recognition and classification 123 may include aspects of machine learning. The object and event recognition and classification 123 can, depending on implementation, use data from the sensors and cameras, data collection, and preprocessing 145 of the first drone 135. In general, any module and process able to be performed by a base station (e.g., the base station 105) may be performed using information or other data provided by a drone (e.g., the first drone 135). In the example of the first drone 135 using the base station 105 for high performance computation, the base station communication link 127, the first drone communication link 147, as well as the communication channel 130 may be used.

Figure 2:
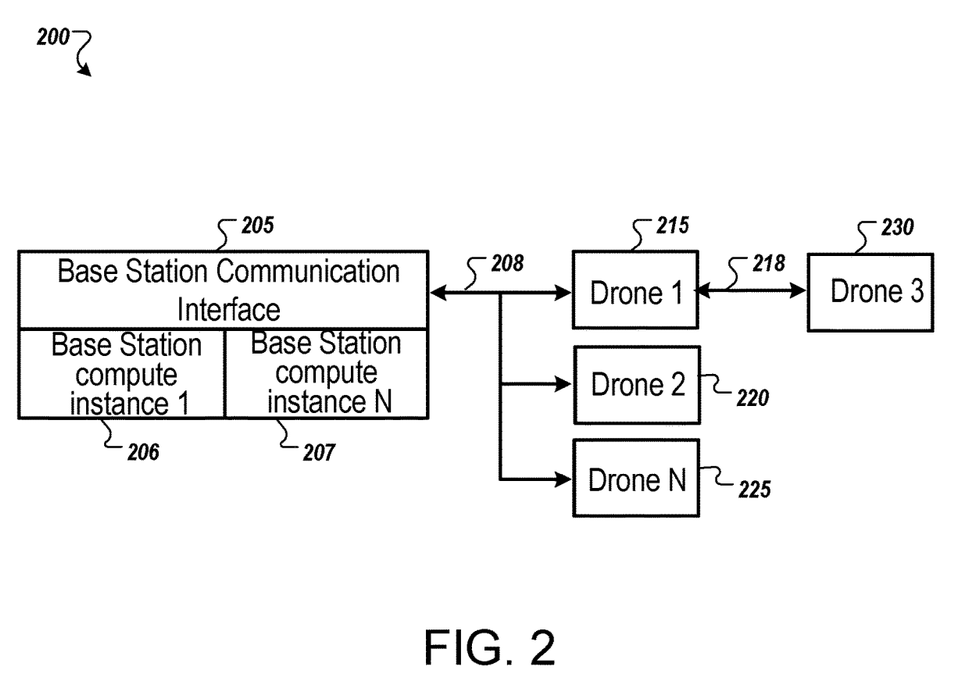
FIG. 2 is a diagram showing an example of a data link configuration between a plurality of drones and a base station.

FIG. 2 is a diagram showing an example of a system 200 for data link configuration between one or more drones and a base station. The system 200 includes a base station communication interface 205, a first base station compute instance 206, an Nth base station compute instance 207, a first data link 208 that connects a first drone 215, a second drone 220, and an Nth drone 225 to the base station communication interface 205, a second data link 218 that is a proxy link that connects a third drone 230 to the first drone 215.

The Nth base station compute instance 207 and the Nth drone 225 are included to show that one or more compute instances and one or more drones, respectively, may be included in the system 200. In general, one or more compute instances can be included in the system 200 and one or more drones can be included in the system 200.

As discussed above, the one or more drones may communicate with the base station specifically the base station communication interface 205. For example, the first drone 215 together with the second drone 220 and the Nth drone 225 can communicate with the base station communication interface 205. To take one specific example, the first drone 215 sends data from one of the modules onboard the first drone 215. The first drone 215 can send visual data obtained from a camera onboard the first drone 215. The visual data can be sent over the first data link 208 to the base station communication interface 205. The base station communication interface 205 can receive the visual data and use the first base station compute instance 206 to process the visual data.

In some instances a drone may be unable to communicate with a base station. In this example, the third drone 230 is unable to communicate with the base station corresponding to the base station communication interface 205. The third drone 230 uses the second data link 218 that is a proxy link that connects the third drone 230 to the first drone 215. As discussed above, the first drone 215, unlike the third drone 230, is able to communicate with the base station communication interface 205. The first drone 215 acts as a proxy node and receives information or data from the third drone 230. The information or data received by the first drone 215 from the third drone 230 is then relayed to the base station communication interface 205 by the first drone 215.

In some implementations, other drones are used to establish a proxy data link between a client or drone that is not connected to a base station, and a client or drone that is connected to the base station. For example, instead of the third drone 230 connecting to the first drone 215, the third drone 230 can connect to the second drone 220 or the Nth drone 225. In general, any drone or client that is able to communicate with a base station can be used by as a proxy by any drone or client that is unable to communicate with the base station. For example, in some cases a drone other than the third drone 230 is unable to communicate with the base station communication interface 205. The other drone can communicate with any drone or client that is able to communicate with the base station communication interface 205 to transfer data from the other drone to the drone or client that is able to communicate with the base station communication interface 205 so that the base station communication interface 205 receives data from the other drone.

The base station communication interface 205 receives information from the first drone 215 that originated from the third drone 230. The base station communication interface 205 processes the data using the first base station compute instance 206. In some instances, other base station compute instances can be used (e.g., the Nth base station compute instance). Processed data after the first base station compute instance 206 processes the received data is then sent back by the base station communication interface 205 to the first drone 215 using the first data link 208. The first drone 215 can again act as a relay and forward the processed data sent from the base station communication interface 205 to the third drone 205 that is unable to communicate directly with the base station communication interface 205.

In some implementations, multiple devices may be used for a single or multiple base stations serving one or more drones. For example, multiple devices may serve as multiple base stations for one or more drones or clients. Instead of having the base station communication interface 205, a system could have a first base station communication interface and a second base station communication interface corresponding to a first base station and a second base station. Depending on implementation, the two or more base stations can work together, sharing data as appropriate or when triggered by a specific system event, can function without direct communication and use intermediary connections for communication, or can function independently. In some cases, a base station, or anther device within a system, can function as a proxy to enable a drone or client, that is unable to communicate with a particular base station, to communication with said particular base station.

In some implementations, a drone communicating with a first base station may continue a current task while communicating with a second base station. For example, the drone may share data with the first base station. The shared data can be stored on either the drone, the first base station, or another component communicably connected to either the drone or the first base station depending on implementation. In some cases, the shared data is sent to the second base station by the first base station or the drone. Based on the shared data, the second base station may communicate with the drone or the drone may communicate with the second base station.

In some implementations, a drone transmits data to both a first base station and a second base station. For example, in a situation where the drone is at or approaching a region where communication with the first base station may deteriorate (e.g., edge of communication range, tunnel, etc.), either the drone or another component in a system (e.g., the first base station, the second base station, etc.) can transmit signals to both the first base station and the second base station. Depending on implementation, the signals can be composed of data related to the first base station, the second base station, or the drone and may enable a process to ensure communication with the drone by at least one of the first base station or the second base station.

In some implementations, protocols exist for deciding which of two or more base stations can control a given drone. For example, in some cases, the base station closest to the given drone will have priority over any other base station. In other cases, the strength of a signal sent between a base station and the given drone may determine which of two or more base stations controls a given drone. For example, the strength of a signal sent between a base station and given drone can be compared with the strength of another base station and the given drone to determine which base station between the base station and the other base station can control the given drone. In yet other cases, the base station that has controlled the given drone for longest may retain control over the given drone. Depending on implementations, other, combinations of the above, or combinations of the above and others, may be used within a system of at least one drone and base station.

In some implementations, two or more base stations communicate over two or more communication mediums with a drone. For example, a first base station may communicate over a first wireless network (e.g., Bluetooth) and a second base station may communicate over a second wireless network (e.g., Wi-Fi). In some cases, the communication can take place using a form of wired connection (e.g., wired LAN, etc.). In one example implementation, the second base station communicates with the drone over the second wireless network while the drone is docked at the second base station. While docked, the drone can receive information through the first wireless network established with the first base station. The received information may include, depending on implementation, directions or situation updates related to a flight path from the second base station to the first base station. In some implementations, the two or more base stations communicate over two or more communication mediums with the drone to coordinate control tasks. For example, a first base station can manage machine vision while a second base station can manage trajectory generation.

In some implementations, two or more base stations communicate with one another. For example, a first base station can communicate with a second base station. The first base station can communicate with the second base station using a form of wired or wireless connection depending on implementation. The communication between the first base station and second base station can be paired with communication to or from one or more drones such that two or more base stations such as the first base station and the second base station can communicate with one another as well as with one or more drones.

In some implementations, a drone, or other component communicably connected to the drone, may use information on one or more base station locations to determine a path of movement. For example, a system that includes a first drone, a first base station, and a second base station, may enable the first drone to stay in communication with at least one of the first base station or the second base station by planning a route related to a given task or tasks that prioritizes maintaining communication with at least one of the first base station or the second base station. In some cases, the distance between the first drone and the first base station and the distance between the first drone and the second base station may be used in path planning. For example, the first base station can use data related to the ability of the first drone to communicate with at least one of the first base station or the second base station to determine a trajectory in the trajectory generation 119 shown in FIG. 1.

In some implementations, one or more base stations in a system is a mobile base station. For example, a mobile base station may be a rover, car, flying drone, or other vehicle. In some cases, one or more mobile base stations move to help maintain coverage for one or more drones that are communicably connected. For example, a base station may fail or otherwise become unresponsive. One or more mobile base stations may move or arrange themselves to influence coverage to mitigate the effects of the unresponsive base station. One or more mobile base stations may be used in other situations as well. For example, a given area can demand many drones and require many base stations to communicate with the many drones. The one or more mobile base stations may move closer to the given area to provide support for the many drones. For another example, a mission may require a drone to move to a location out of range of a current base station or system network. One or more mobile base stations can move to aid the drone in the mission (e.g., navigate with the drone, navigate to the location of the mission, provide a communication region that serves as a bridge between an area of coverage and another area of coverage, etc.).

In some implementations, movement of one or more mobile stations and drones within a system may be optimized for one or more parameters. For example, the movement of one or more mobile stations and drones within a system may be optimized for battery life. The system may be optimized for battery life by prioritizing current positions over other positions, prioritizing more stationary positions near highly active regions thus requiring less movement on the part of the base stations, or another algorithm. For another example, the system may be optimized for coverage. The system may be optimized for coverage by authorizing greater movement for the one or more mobile stations to extend or alter a region of communication to allow for greater maneuverability or freedom for drones within the system.

In some implementations, a drone or base station within a system communicates with other components in the system to determine aspects of a task, mission or surveillance. For example, an indoor camera can be used to cover a portion of a property and, as a consequence, that area may not need drone surveillance. The area may obtain drone surveillance if an event is detected in that area. In general, data detected by one or more components of a system such as a monitoring system may inform one or more decisions or determinations made by a drone or a base station within the system.

In some cases, the specific compute instance depends on the data received and or the situation or instructions sent before the data is received. For example, one or more drones can work together and share a given compute instance in missions or scenarios where a shared calculation such as mutual location, for instance, can be useful.

In some implementations, a drone can send other forms of data to a base station. For example, instead of the first drone 215 sending visual data obtained from a camera onboard the first drone 215, the first drone 215 can send a location obtained from a global positioning system (GPS) onboard. In some implementations, this location can be used for navigation processing by the base station.

In some implementations, a drone can be a form of security camera drone (SCD). In some implementations, a base station can be a form of a remote stationary ground control and computer station (GCCS).

Figure 3:
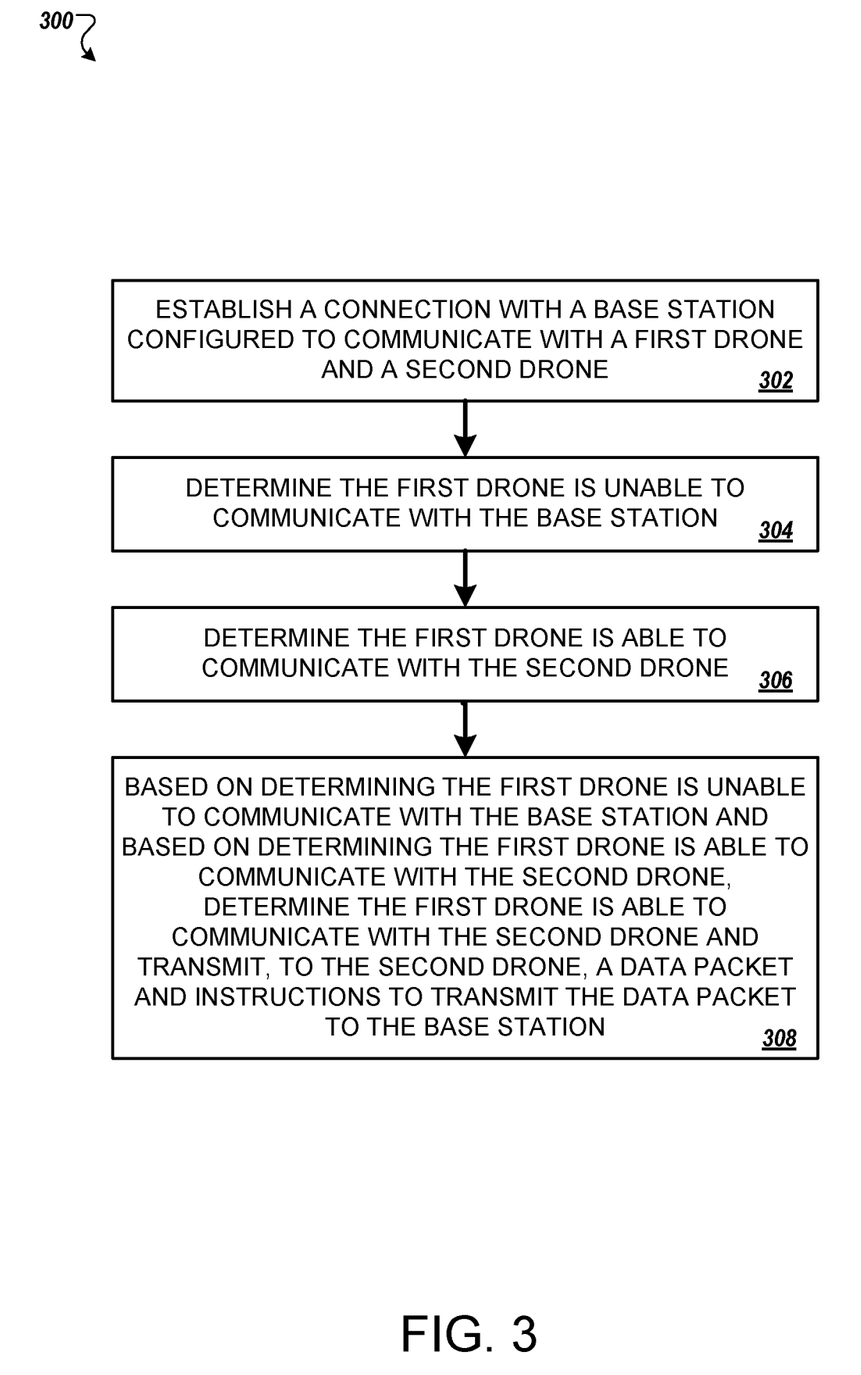
FIG. 3 is a flow diagram illustrating an example of a process for drone communication coupling to a base station.

FIG. 3 is a flow diagram illustrating an example of a process 300 for drone communication coupling to a base station. The process 300 may be performed by one or more electronic systems, for example, the system 200 of FIG. 2.

The process 300 includes establishing a connection with a base station configured to communicate with a first drone and a second drone (302). For example, the base station communication interface 205 is configured to communicate with the first drone 215 and the third drone 230 among other drones or clients.

The process 300 includes determining the first drone is unable to communicate with the base station (304). For example, the third drone 230 is unable to communicate with the base station communication interface 205.

The process 300 includes determining the first drone is able to communicate with the second drone (306). For example, the third drone 230 is able to communicate with the first drone 215.

The process 300 includes, based on determining the first drone is unable to communicate with the base station and based on determining the first drone is able to communicate with the second drone, determining the first drone is able to communicate with the second drone and transmitting, to the second drone, a data packet and instructions to transmit the data packet to the base station (308). For example, the third drone 230 transmits data to the first drone 215 and the first drone 215 transmits said data to the base station communication interface 205.

Figure 4:
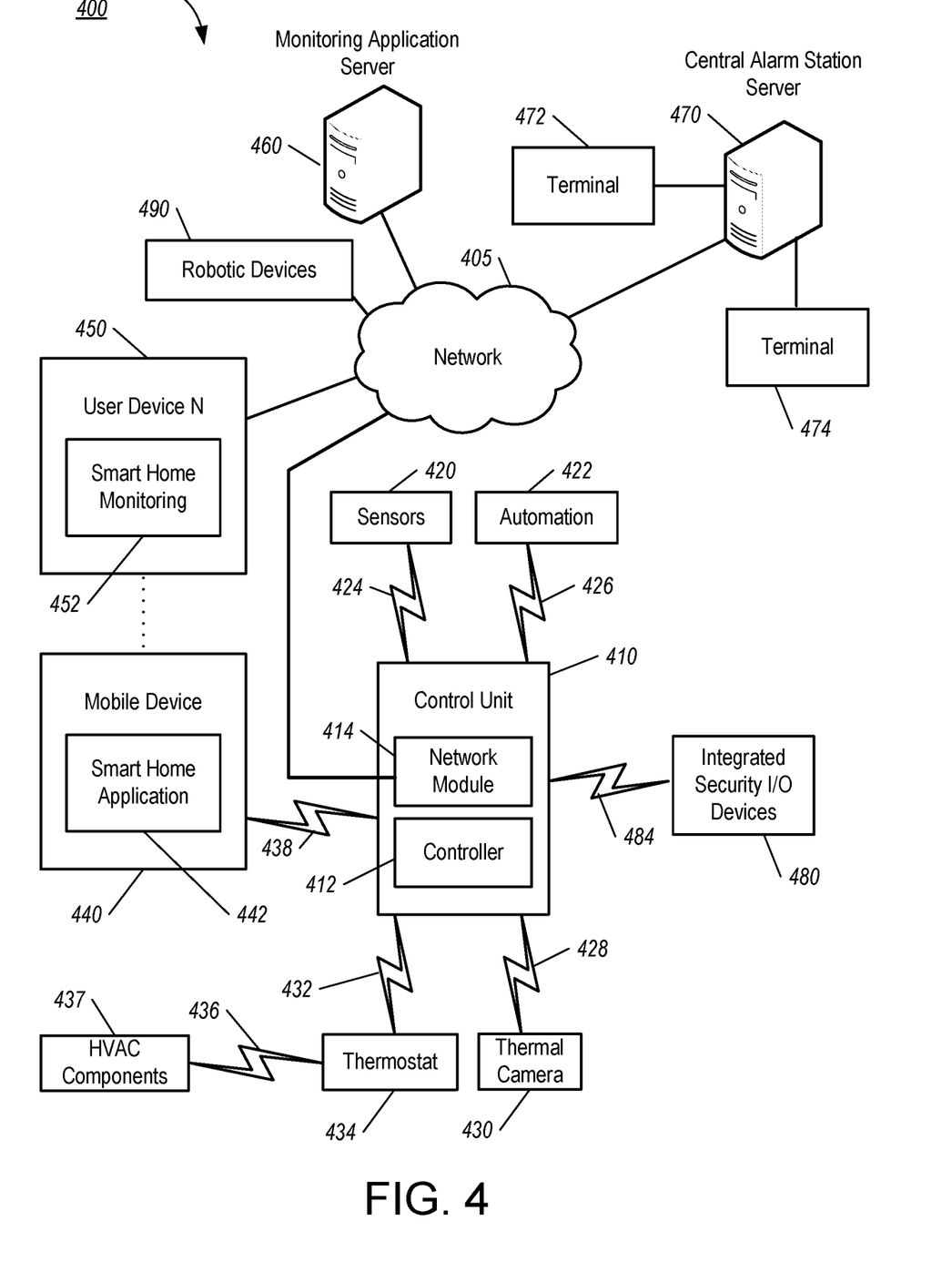
FIG. 4 is a diagram illustrating an example of a property monitoring system.

FIG. 4 is a diagram illustrating an example of a property monitoring system. The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors 420. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 420 can also include a radio-frequency identification (RFID) sensor that identifies a particular article that includes a pre-assigned RFID tag.

The system 400 also includes one or more thermal cameras 430 that communicate with the control unit 410. The thermal camera 430 may be an IR camera or other type of thermal sensing device configured to capture thermal images of a scene. For instance, the thermal camera 430 may be configured to capture thermal images of an area within a building or home monitored by the control unit 410. The thermal camera 430 may be configured to capture single, static thermal images of the area and also video thermal images of the area in which multiple thermal images of the area are captured at a relatively high frequency (e.g., thirty images per second). The thermal camera 430 may be controlled based on commands received from the control unit 410. In some implementations, the thermal camera 430 can be an IR camera that captures thermal images by sensing radiated power in one or more IR spectral bands, including NIR, SWIR, MWIR, and/or LWIR spectral bands.

The thermal camera 430 may be triggered by several different types of techniques. For instance, a Passive Infra-Red (PIR) motion sensor may be built into the thermal camera 430 and used to trigger the thermal camera 430 to capture one or more thermal images when motion is detected. The thermal camera 430 also may include a microwave motion sensor built into the camera and used to trigger the thermal camera 430 to capture one or more thermal images when motion is detected. The thermal camera 430 may have a "normally open" or "normally closed" digital input that can trigger capture of one or more thermal images when external sensors (e.g., the sensors 420, PIR, door/window, etc.) detect motion or other events. In some implementations, the thermal camera 430 receives a command to capture an image when external devices detect motion or another potential alarm event. The thermal camera 430 may receive the command from the controller 412 or directly from one of the sensors 420.

In some examples, the thermal camera 430 triggers integrated or external illuminators (e.g., Infra-Red or other lights controlled by the property automation controls 422, etc.) to improve image quality. An integrated or separate light sensor may be used to determine if illumination is desired and may result in increased image quality.

The thermal camera 430 may be programmed with any combination of time/day schedules, monitoring system status (e.g., "armed stay," "armed away," "unarmed"), or other variables to determine whether images should be captured or not when triggers occur. The thermal camera 430 may enter a low-power mode when not capturing images. In this case, the thermal camera 430 may wake periodically to check for inbound messages from the controller 412. The thermal camera 430 may be powered by internal, replaceable batteries if located remotely from the control unit 410. The thermal camera 430 may employ a small solar cell to recharge the battery when light is available. Alternatively, the thermal camera 430 may be powered by the controller's 412 power supply if the thermal camera 430 is co-located with the controller 412.

In some implementations, the thermal camera 430 communicates directly with the monitoring server 460 over the Internet. In these implementations, thermal image data captured by the thermal camera 430 does not pass through the control unit 410 and the thermal camera 430 receives commands related to operation from the monitoring server 460.

In some implementations, the system 400 includes one or more visible light cameras, which can operate similarly to the thermal camera 430, but detect light energy in the visible wavelength spectral bands. The one or more visible light cameras can perform various operations and functions within the property monitoring system 400. For example, the visible light cameras can capture images of one or more areas of the property, which the cameras, the control unit, and/or another computer system of the monitoring system 400 can process and analyze.

The system 400 also includes one or more property automation controls 422 that communicate with the control unit to perform monitoring. The property automation controls 422 are connected to one or more devices connected to the system 400 and enable automation of actions at the property. For instance, the property automation controls 422 may be connected to one or more lighting systems and may be configured to control operation of the one or more lighting systems. Also, the property automation controls 422 may be connected to one or more electronic locks at the property and may be configured to control operation of the one or more electronic locks (e.g., control Z-Wave locks using wireless communications in the Z-Wave protocol). Further, the property automation controls 422 may be connected to one or more appliances at the property and may be configured to control operation of the one or more appliances. The property automation controls 422 may include multiple modules that are each specific to the type of device being controlled in an automated manner. The property automation controls 422 may control the one or more devices based on commands received from the control unit 410. For instance, the property automation controls 422 may interrupt power delivery to a particular outlet of the property or induce movement of a smart window shade of the property.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at the property and/or environmental data at the home, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, one or more of the elements shown in FIG. 4 provide data to one or more of the components shown in the base station 105 and the first drone 135 of FIG. 1. For example, one or more of the thermal cameras 430 or other cameras on a property may be used in the trajectory generation 119 discussed above in reference to FIG. 1.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more property automation controls 422.

In some implementations, a module 437 is connected to one or more components of an HVAC system associated with the property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robot that are capable of moving and taking actions that assist in home monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan of a building on the property and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, one or more of the thermal cameras 430 may be mounted on one or more of the robotic devices 490.

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 can be associated with one or more charging stations. The charging stations may be located at predefined home base or reference locations at the property. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact-based charging stations and/or wireless charging stations. For contact-based charging stations, the robotic devices 490 may have readily accessible points of contact that the robotic devices 490 are capable of positioning and mating with a corresponding contact on the charging station. For instance, a helicopter type robotic device 490 may have an electronic contact on a portion of its landing gear that rests on and mates with an electronic pad of a charging station when the helicopter type robotic device 490 lands on the charging station. The electronic contact on the robotic device 490 may include a cover that opens to expose the electronic contact when the robotic device 490 is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device 490 may always use a first charging station and a second robotic device 490 may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device 490 to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the property automation controls 422, the thermal camera 430, the thermostat 434, and the integrated security devices 480 may communicate with the controller 412 over communication links 424, 426, 428, 432, and 484. The communication links 424, 426, 428, 432, and 484 may be a wired or wireless data pathway configured to transmit signals from the sensors 420, the property automation controls 422, the thermal camera 430, the thermostat 434, and the integrated security devices 480 to the controller 412. The sensors 420, the property automation controls 422, the thermal camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, and 484 may include a local network. The sensors 420, the property automation controls 422, the thermal camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 4 (CAT5) or Category 6 (CAT6) wired Ethernet network. The local network may be a mesh network constructed based on the devices connected to the mesh network.

The monitoring server 460 is one or more electronic devices configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor data, thermal image data, and other monitoring system data received from the monitoring system and perform analysis of the sensor data, thermal image data, and other monitoring system data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, thermal image, and other data to determine an activity pattern of a resident of the property monitored by the system 400. In some implementations, the monitoring server 460 may analyze the data for alarm conditions or may determine and perform actions at the property by issuing commands to one or more of the automation controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the thermal camera 430 and/or reports related to the monitoring system. Although FIG. 4 illustrates two user devices for brevity, actual implementations may include more (and, perhaps, many more) or fewer user devices.

The smart home application 442 and the smart home user interface 452 can allow a user to interface with the property monitoring system 400, for example, allowing the user to view monitoring system settings, adjust monitoring system parameters, customize monitoring system rules, and receive and view monitoring system messages.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors 420 and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system 400.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the property automation controls 422, the thermal camera 430, and the robotic devices 490. The one or more user devices 440 and 450 receive data directly from the sensors 420, the property automation controls 422, the thermal camera 430, and the robotic devices 490 (i.e., the monitoring system components) and sends data directly to the monitoring system components. The one or more user devices 440, 450 provide the appropriate interfaces/processing to provide visual surveillance and reporting.

In other implementations, the system 400 further includes network 405 and the sensors 420, the property automation controls 422, the thermal camera 430, the thermostat 434, and the robotic devices 49 are configured to communicate sensor and image data to the one or more user devices 440 and 450 over network 405 (e.g., the Internet, cellular network, etc.). In yet another implementation, the sensors 420, the property automation controls 422, the thermal camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the property automation controls 422, the thermal camera 430, the thermostat 434, and the robotic devices 490 to a pathway over network 405 when the one or more user devices 440 and 450 are farther from the sensors 420, the property automation controls 422, the thermal camera 430, the thermostat 434, and the robotic devices 490. In some examples, the system leverages GPS information from the one or more user devices 440 and 450 to determine whether the one or more user devices 440 and 450 are close enough to the monitoring system components to use the direct local pathway or whether the one or more user devices 440 and 450 are far enough from the monitoring system components that the pathway over network 405 is required. In other examples, the system leverages status communications (e.g., pinging) between the one or more user devices 440 and 450 and the sensors 420, the property automation controls 422, the thermal camera 430, the thermostat 434, and the robotic devices 490 to determine whether communication using the direct local pathway is possible. If communication using the direct local pathway is possible, the one or more user devices 440 and 450 communicate with the sensors 420, the property automation controls 422, the thermal camera 430, the thermostat 434, and the robotic devices 490 using the direct local pathway. If communication using the direct local pathway is not possible, the one or more user devices 440 and 450 communicate with the monitoring system components using the pathway over network 405.

In some implementations, the system 400 provides end users with access to thermal images captured by the thermal camera 430 to aid in decision making. The system 400 may transmit the thermal images captured by the thermal camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 430 or other cameras of the system 400). In these implementations, the thermal camera 430 may be set to capture thermal images on a periodic basis when the alarm system is armed in an "armed away" state, but set not to capture images when the alarm system is armed in an "armed stay" or "unarmed" state. In addition, the thermal camera 430 may be triggered to begin capturing thermal images when the alarm system detects an event, such as an alarm event, a door-opening event for a door that leads to an area within a field of view of the thermal camera 430, or motion in the area within the field of view of the thermal camera 430. In other implementations, the thermal camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
a first drone that is configured to monitor the property; and
a base station that is configured to communicate with the first drone,
wherein the first drone is configured to:
determine that the first drone is approaching a region previously determined as including an obstruction that deteriorates communication between the first drone and the base station;
based on determining that the first drone is approaching the region and before the first drone is within the region, transmit data packets, related to the base station and a second base station, to both the base station and the second base station; and
provide control from the base station to the second base station once the data packets for the base station no longer reach the base station.

2. The system of claim 1, wherein a second drone of the monitoring system is configured to:
receive, from the first drone, a data packet and instructions to transmit the data packet to the base station; and
based on receiving, from the first drone, the data packet and instructions to transmit the data packet to the base station, transmit, to the base station, the data packet.

3. The system of claim 1, wherein the base station is configured to:
determine that the base station is unable to communicate with the first drone;
determine that the base station is able to communicate with a second drone of the monitoring system; and
based on determining that the base station is unable to communicate with the first drone and based on determining that the base station is able to communicate with the second drone, transmit, to the second drone, an additional data packet and instructions to transmit a data packet to the first drone.

4. The system of claim 3, wherein the second drone of the monitoring system is configured to:
receive, from the base station, the data packet and instructions to transmit the additional data packet to the first drone; and
based on receiving, from the base station, the additional data packet and instructions to transmit the data packet to the first drone, transmit, to the first drone, the additional data packet.

5. The system of claim 1, wherein the first drone and a second drone of the monitoring system each comprise an attitude stabilizer, a motor controller, a position controller, an optical flow unit, a sensor, and a radio.

6. The system of claim 1, wherein the base station comprises:
an obstacle avoider, a navigator, a neural network, an object recognizer, an object classifier, an event recognizer, an event classifier, a machine vision unit, a visual-inertial odometry unit, a point cloud processing unit, a trajectory generation unit, and a radio.

7. The system of claim 6, wherein each of the obstacle avoider, the navigator, the neural network, the object recognizer, the object classifier, the event recognizer, the event classifier, the machine vision unit, the visual-inertial odometry unit, the point cloud processing unit, the trajectory generation unit are configured to simultaneously process data associated with the first drone and data associated with a second drone of the monitoring system.

8. The system of claim 1, wherein the first drone is configured to:
determine that an event is occurring at the property,
wherein determining that the first drone is unable to communicate with the base station and determining that the first drone is able to communicate with a second drone of the monitoring system is based on the event that is occurring at the property.

9. The system of claim 1, wherein the first drone is configured to:
determine a status of the monitoring system,
wherein determining that the first drone is unable to communicate with the base station and determining that the first drone is able to communicate with a second drone of the monitoring system is based on the status of the monitoring system.

10. The system of claim 1, wherein the first drone is configured to:
transmit data packets related to the base station using a first network type; and
transmit data packets related to the second base station using a second network type, wherein the first network type and the second network type are different network types.

11. The system of claim 1, wherein the first drone is configured to:
encode data related to the base station into data packets transmitted to the base station; and
encode data related to the second base station into data packets transmitted to the second base station.

12. The system of claim 1, wherein the base station communicates with the first drone and manages machine vision and the second base station communicates with the first drone and manages trajectory generation.

13. The system of claim 1, wherein the obstruction is a physical wall.

14. The system of claim 1, wherein the first drone is configured to:
compare a first time, indicating a period of time in which the first drone has been controlled by the base station, with a second time, indicating a period of time in which the first drone has been controlled by the second base station; and
when receiving control signals from both the base station and the second base station, assign priority to control signals from the base station based on determining the first time is larger than the second time.

15. A computer-implemented method comprising:
determining, by a monitoring system that is configured to monitor a property and that includes a first drone and a base station that is configured to communicate with the first drone, that the first drone is approaching a region previously determined as including an obstruction that deteriorates communication between the first drone and the base station;
based on determining that the first drone is approaching the region and before the first drone is within the region, transmitting data packets, related to the base station and a second base station, to both the base station and the second base station; and
providing control from the base station to the second base station once the data packets for the base station no longer reach the base station.

16. The computer-implemented method of claim 15, wherein a second drone of the monitoring system is configured to:
receive, from the first drone, a data packet and instructions to transmit the data packet to the base station; and
based on receiving, from the first drone, the data packet and instructions to transmit the data packet to the base station, transmit, to the base station, the data packet.

17. The computer-implemented method of claim 15, wherein the base station is configured to:
determine that the base station is unable to communicate with the first drone;
determine that the base station is able to communicate with a second drone of the monitoring system; and
based on determining that the base station is unable to communicate with the first drone and based on determining that the base station is able to communicate with the second drone, transmit, to the second drone, an additional data packet and instructions to transmit a data packet to the first drone.

18. The computer-implemented method of claim 17, wherein the second drone of the monitoring system is configured to:
receive, from the base station, the data packet and instructions to transmit the additional data packet to the first drone; and
based on receiving, from the base station, the additional data packet and instructions to transmit the data packet to the first drone, transmit, to the first drone, the additional data packet.

19. The computer-implemented method of claim 15, wherein the base station comprises:
an obstacle avoider, a navigator, a neural network, an object recognizer, an object classifier, an event recognizer, an event classifier, a machine vision unit, a visual-inertial odometry unit, a point cloud processing unit, a trajectory generation unit, and a radio, and
wherein each of the obstacle avoider, the navigator, the neural network, the object recognizer, the object classifier, the event recognizer, the event classifier, the machine vision unit, the visual-inertial odometry unit, the point cloud processing unit, the trajectory generation unit are configured to simultaneously process data associated with the first drone and data associated with a second drone of the monitoring system.

20. A non-transitory computer-readable medium storing one or more instructions executable by a computer system to perform operations comprising:
determining, by a monitoring system that is configured to monitor a property and that includes a first drone and a base station that is configured to communicate with the first drone, that the first drone is approaching a region previously determined as including an obstruction that deteriorates communication between the first drone and the base station;
based on determining that the first drone is approaching the region and before the first drone is within the region, transmitting data packets, related to the base station and a second base station, to both the base station and the second base station; and providing control from the base station to the second base station once the data packets for the base station no longer reach the base station.

\* \* \* \* \*